United States Patent [19]

Saunders et al.

[11] 4,215,029
[45] Jul. 29, 1980

[54] CROSSLINKABLE POLYMER COATING COMPOSITIONS AND PROCESS FOR PREPARING THE SAME USING TETRACHLOROETHYLENE OR 1,1,1-TRICHLOROETHYLENE SOLVENT

[75] Inventors: Frank L. Saunders; Victor E. Meyer, both of Midland, Mich.

[73] Assignee: The Dow Chemical Company, Midland, Mich.

[21] Appl. No.: 956,952

[22] Filed: Nov. 2, 1978

[51] Int. Cl.$^2$ ................................................ C08K 5/02
[52] U.S. Cl. ........................... 260/33.8 UA; 525/380; 525/382; 260/33.8 R
[58] Field of Search ........................ 260/851, 33.8 UA; 526/98, 52.2, 52.7, 52.4, 86, 87

[56] References Cited

U.S. PATENT DOCUMENTS

| | | | |
|---|---|---|---|
| 3,183,282 | 5/1965 | Hurwitz | 260/851 |
| 3,267,174 | 8/1966 | Fry et al. | 260/851 |
| 3,948,866 | 4/1976 | Pennewiss et al. | 260/29.6 RW |
| 3,966,667 | 6/1976 | Sullivan et al. | 260/33.8 UA |
| 3,992,342 | 11/1976 | Tsubuko et al. | 260/28.5 A |

*Primary Examiner*—Joseph L. Schofer
*Assistant Examiner*—Peter F. Kulkosky

[57] ABSTRACT

Lacquers of crosslinkable polymers are prepared by an improved process wherein a monomer composition of an olefinically unsaturated carboxylic acid, a hydroxyalkyl acrylate and at least one other monomer from the group of alkenyl aromatic monomers, alkyl acrylates or mixtures thereof is dissolved in tetrachloroethylene or 1,1,1-trichloroethane or mixtures thereof and caused to polymerize.

8 Claims, No Drawings

CROSSLINKABLE POLYMER COATING COMPOSITIONS AND PROCESS FOR PREPARING THE SAME USING TETRACHLOROETHYLENE OR 1,1,1-TRICHLOROETHYLENE SOLVENT

BACKGROUND OF THE INVENTION

The coatings and ink industries have been searching for ways to reduce or eliminate the amount of solvents which potentially are or have been determined to be hazardous to the environment and/or the health and welfare of the populace, including flammability and thus do not meet safety standards for consumer use. The solvents currently employed require large volumes of air for safe industrial use. In addition, many of the solvents also create problems of solubility, poor viscosity profiles, and other known difficulties.

The coatings and ink industries have used reactive diluents to increase the rate of cure, obtain the desired degree of hardness and to solubilize the film-forming compounds which have viscosities from about 100,000 cps to several million cps. However, most of these reactive diluents are toxic and expensive so that the systems employing them are under severe restrictions as well as not being economically competitive.

SUMMARY OF THE INVENTION

The invention is directed to the preparation of organic solutions useful as coating compositions by polymerizing certain olefinically unsaturated monomers in certain proportions in a chlorinated solvent that is to be used as the vehicle in the coating composition.

DESCRIPTION OF THE INVENTION

The interpolymer finding use in the process and compositions of this invention is composed essentially of from about 10 to 25 weight percent of a 2-hydroxyalkyl acrylate or 2-hydroxyalkyl methacrylate wherein, in either instance, the hydroxyalkyl group contains from 2 to 4 carbon atoms, and from about 2 1 to 15 weight percent of an alpha,beta-olefinically unsaturated carboxylic acid with the remainder being at least one comonomer from the group of alkenyl aromatic monomers, alkyl acrylates containing from 1 to 8 carbon atoms in the alkyl group or mixtures thereof.

Various monoalkenyl aromatic hydrocarbons of the benzene series may be suitable comonomers for the presently intended purpose and such monomers are characterized by the general formula:

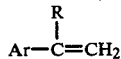

wherein Ar, selected independently, represents an aromatic hydrocarbon and a nuclear halohydrocarbon radical and R is hydrogen, a $C_1$–$C_4$ alkyl radical, or a halogen radical having an atomic number of from 17 to 35, including styrene, α-methylstyrene, o-methylstyrene, p-methylstyrene, m-methylstyrene, ar-ethylstyrene, propylstyrenes, butylstryrenes, ar-chlorostyrene, ar-bromostyrene and the like.

Polymerizable alkyl acrylates within the scope include $C_1$–$C_8$ primary and secondary alkyl esters such as methyl acrylate, ethyl acrylate, propyl- and isopropyl acrylates, butyl-, isobutyl- and sec-butyl acrylates, amyl and isoamyl acrylates, hexyl acrylate, 2-ethylhexyl acrylate and the like. The alkyl methacrylates are polymerizable in the process but generally give solutions that are too viscous at the solids needed and affect other properties adversely. A small amount of the styrene or alkyl acrylate may, however, under certain conditions, be replaced with a methacrylate ester.

The hydroxyalkyl acrylate or methacrylate will be the hydroxyethyl, 2-hydroxypropyl or 2-hydroxybutyl acrylate or methacrylate.

Included within the scope of the unsaturated acid are both monocarboxylic acids and polycarboxylic acids. The monocarboxylic acids include acrylic acid, methacrylic acid, crotonic acid and the like. The polycarboxylic acids comprise maleic, fumaric, itaconic, citraconic, mesaconic, aconitic and the related halogenated acids. The acids may be used singly or in combination.

Advantageously, the monomer compositions will include both styrene and an alkyl acrylate in addition to the acid and hydroxyalkyl acrylate. Preferred compositions are those of from about 15 to 40 weight percent of the alkenyl aromatic monomer, from about 10 to 75 weight percent alkyl acrylate, from about 10 to 25 weight percent hydroxyalkyl acrylate and from about 1 to 15 weight percent unsaturated acid. As mentioned, a part of the styrene or alkylacrylate may be replaced with methyl methacrylate. However, it has been found that the hydroxyalkyl acrylate should then be hydroxypropyl acrylate. Also with such monomer mixtures a larger amount of 1,1,1-trichloroethane must be used to achieve a clear solution than if no methyl methacrylate was employed. Similar adjustments are frequently advantageous when the comonomer is entirely a lower alkylacrylate such as methyl or ethyl acrylate.

The solvents to be used for the polymerization and lacquer preparation are tetrachloroethylene, 1,1,1-trichloroethane or mixtures thereof in all proportions. Other chlorinated solvents suffer from one or more disadvantages; as, for example, adverse environmental impact, excessive volatility, etc.

The monomers may be present in the solvent in an amount of up to about 60 weight percent. Above that amount the polymer reaches a limit of useful viscosity. The coatings formulator will recognize that the concentration by volume is very favorable.

Many halogenated solvents, such as chloroform, carbon tetrachloride, carbon tetrabromide and others are known chain transfer agents. It was unexpected that the solvents of this invention do not exert a significant chain transfer activity during the polymerization. Consequently, it is frequently helpful to include a small amount of a chain regulator, such as a mercaptan, in the reaction mixture to adjust the molecular weight to the desired level.

The polymerization is conducted under conditions conventional for solution polymerization. Small catalytic amounts of organo-soluble catalysts, such as benzoyl peroxide, lauroyl peroxide, azo-bis-diisobutyronitrile or other known free radical catalysts are employed. The temperature can be from about 50° C. up to the reflux temperature of the solvents. The monomers may be added to the initial mix or may be added in continuous or stepwise manner to the polymerizing system.

The result of the polymerization is a clear solution of a viscosity that is acceptably handled in coatings applications. It is an advantage of the invention that the polymer does not have to be isolated from the solvent.

The solution can be used as is to formulate the coatings composition.

Although the solution of the polymer is film forming, the resultant films generally have less than desirable properties. Accordingly, it is preferred to add a cross-linking agent to the solution to upgrade those properties to an acceptable level. Crosslinking agents, such as melamine-formaldehyde resins, are added. Such crosslinking agents should have two or more groups that are reactive with either the pendant carboxyl groups or hydroxyalkyl groups of the polymer.

It may be necessary to add more solvent along with the crosslinking agent especially at the higher solids level to retain or to adjust the formulation viscosity.

The compositions are useful to coat a variety of substrates by conventional coating techniques, such as brushing, padding, doctor blades and other known means. The substrates may be porous or nonporous, flexible or rigid and include ceramics, plastics, wood, metals and like materials.

The invention will be illustrated by the following examples wherein all parts and percentages are by weight.

EXAMPLE 1

A. To a 500 cc round bottom flask equipped with stirrer, condenser and addition funnel was charged 250 g of perchloroethylene and heated to 90° C. Over a period of 2½ hours, the following monomer mixture was continuously added to the reaction flask:
100 g Butyl acrylate
50 g Styrene
44 g Hydroxypropyl acrylate
6 g Acrylic acid
2 g Azo-bis-isobutyronitrile (Vazo 64)
1.5 g tert-Dodecyl mercaptan After an additional ½ hour reaction time at 90° C., an additional 0.2 g of Vazo 64 was added and at ½ hour intervals thereafter additional 0.2 g of Vazo 64 was added for a total of 5 catalyst additions. After the last catalyst addition, the reaction was continued for an additional ½ hour, for a total reaction time of 5½ hours. The polymer solution was cooled to room temperature for characterization and evaluation of coating properties.

B. The above procedure was followed except the monomer mixture was of the following composition:
110 g Butyl acrylate
54 g Styrene
30 g Hydroxypropyl acrylate
6 g Acrylic Acid
2 g Vazo 64
1.5 g tert-Dodecyl mercaptan C. The above procedure was followed except the monomer mixture was of the following composition:
116 g Butyl acrylate
58 g Styrene
20 g Hydroxypropyl acrylate
6 g Acrylic acid
2 g Vazo 64
1.5 g tert-Dodecyl mercaptan The polymers from Example 1A, 1B and 1C had the following characteristics:

|  | A | B | C |
| --- | --- | --- | --- |
| % Solids | 44.0 | 44.5 | 44.3 |
| Solution appearance | Clear | Clear | Clear |
| Brookfield viscosity, cps | 2,640 | 1,313 | 820 |

EXAMPLE 2

The polymer solutions of Example 1A–C were formulated with melamine resin, Uformite MM83, to 25%, based on total solids, and adjusted to 40% solids with perchloroethylene. The polymer solutions were then cast on Bonderite 1000 steel panels using a 5 mil film casting bar. The panels were then cured at 125° C. for 30 minutes in a circulating air oven. Final coating thickness is in the range of 0.8–1.0 mil.

The following tests were carried out on the coated panels:

Impact: A Gardner Impact tester was used to measure impact durability of coating under direct impact on coating surface and on reverse side of panel. The values reported in inch-pounds represent the maximum for no coating failure as detected by a conductance test using a salt solution on the coating surface in the impact area.

Gloss: A Gardner Glossmeter was used to measure gloss of coating at 60°. Units of gloss are reported from 0 to 100.

MEK Resistance: The coating surface is rubbed with a cloth saturated with methyl ethyl ketone for 100 double rubs. The effect on the coating is rated as Excellent (E) if no visible effect is noted on the coating such as loss of gloss or removal of surface. There may be a slight softening of coating which is recovered when dry; Good (G), no visible effect on coating but a significant softening of coating; Fair (F), some loss of gloss and softening; Poor (P), coating is removed from surface of panel.

Knoop Hardness Number (KHN): A Kentron Model AK Micro Hardness Tester was used with a 400 gm loading. The coating hardness is reported as Knoop Hardness Numbers, KHN.

Humidity Exposure, Gloss: The relative sensitivity of the coating to moisture was measured by exposing the coating surface held in a horizontal position over a water bath maintained at 150° F. The moisture condenses on the coating surface. The coating is observed after 4 hours and 24 hours exposure and a 60° gloss reading is determined on the coating to indicate a change in gloss, usually associated with a whitening of the coating.

The results are shown in the following table.

| Coating Properties | A | B | C |
| --- | --- | --- | --- |
| Impact, Direct/Reverse (in-lbs) | 120/60 | 120/80 | 60/10 |
| Gloss, 60° | 97 | 100 | 100 |
| MEK Resistance | E | G | G |
| Knoop Hardness No. | 18.5 | 20.2 | 18.8 |
| Gloss-Humidity Exposure, 4 hrs/24 hrs | 95/85 | 96/91 | 99/91 |

From the above results, it can be seen that the polymer compositions of Example 1A–C produce high gloss, durable clear thermoset coatings on metal from nonflammable perchloroethylene solvent.

EXAMPLE 3

The procedure of Example 1-B was followed except 1,1,1-trichloroethane was substituted for perchloroethylene as the polymerization solvent. The resulting polymer solution was clear with a solids content of 44.6% and a viscosity of 1,100 cps. Properties of the clear coating as prepared as described above for Examples 1-2 were as follows:

| | |
|---|---|
| Impact, D/R (in-lbs) | 60/40 |
| Gloss, 60° | 100 |
| MEK Resistance | G |
| Knoop Hardness No. | 19.3 |
| Gloss-Humidity Exposure, 4 hrs/24 hrs | 98/93 |

EXAMPLES 4-8

Additional compositions prepared by the procedure of Example 1 with resulting solution and coating properties are given in Table I.

In the Table:
S is styrene
BA is butyl acrylate
IBMA is isobutyl methacrylate
AA is acrylic acid
MAA is methacrylic acid
HEA is hydroxyethyl acrylate
HPA is hydroxypropyl acrylate

TABLE I

| Example No. | Monomer Composition | % Solids | Visc. cps | Solution | Impact in-lbs | Gloss 60° | MEK | KHN | Humidity Gloss 4/24 hrs |
|---|---|---|---|---|---|---|---|---|---|
| This Invention | | | | | | | | | |
| 4 | S/BA/HPA/MAA 27/55/15/3 | 42.9 | 920 | Clear | 80/40 | 100 | E | 24.2 | 99/92 |
| 5 | S/BA/HEA/AA 58/29/10/3 | 42 | 660 | Clear | 20/<10 | 100 | G | 20.2 | 96/70 |
| 6 | EA/HPA/AA 82/15/3 | 45.4 | 1788 | Slightly Hazy | 60/20 | 100 | E | 15.7 | 100/87 |
| For Comparison | | | | | | | | | |
| 7 | S/BA/IBMA 30/55/15 | 39 | 696 | Clear | <10/<10 | 94 | P | <7 | 14/W$^b$ |
| 8 | S/BA/HEA 48/32/20 | 41 | 900 | Clear | 20/<10 | 99 | F | 22 | 72/W$^b$ |
| 9 | S/BA/HEA 32/58/10 | 43 | 418 | Clear | 40/<10 | 99 | F | 9.3 | W$^b$ |

$^b$ = coating turned white

EXAMPLE 10

The procedure of Example 1 was followed with the following monomer mixture:
82 g Sec-butyl acrylate
15 g Hydroxypropyl acrylate
3 g Acrylic acid The polymer solution resulting from this polymerization was clear and had a viscosity of 3,250 cps.

When formulated as with the previous examples, coated on panels and cured, the following results were obtained from the tests: impact resistance=40/10; gloss=100; MEK resistance=E; Knoop Hardness No.=20 and humidity=100/100.

What is claimed:

1. In the process for preparing a lacquer from crosslinkable polymers, the improvement wherein a monomer composition consisting essentially of (1) from about 1 to 15 weight percent of an alpha,beta-olefinically unsaturated carboxylic acid; (2) from about 10 to 25 weight percent of a hydroxyalkyl acrylate or methacrylate wherein the hydroxyalkyl group has from 2 to 4 carbon atoms in the alkyl group and; (3) the remainder needed to make 100 weight percent of at least one comonomer selected from the group consisting of an alkenyl aromatic monomer, an alkyl acrylate having from 1 to 8 carbon atoms in the alkyl group and mixtures thereof, is dissolved in tetrachloroethylene, 1,1,1-trichloroethane or mixtures thereof and subjected to thermal and catalytic inducement of free radical polymerization, and thereafter a crosslinking agent having at least 2 functional moieties reactive with the hydroxyalkyl groups or the carboxyl groups is dissolved in the solution of the interpolymer.

2. The process of claim 1 wherein said comonomer is a mixture of styrene and an alkyl acrylate.

3. The process of claim 2 wherein said styrene is from about 15 to 40 weight percent of the composition and said alkyl acrylate is from about 20 to 75 weight percent of the composition.

4. The process of claim 1 wherein said hydroxyalkyl acrylate is hydroxyethyl acrylate.

5. The process of claim 1 wherein said hydroxyalkyl acrylate is hydroxypropyl acrylate.

6. The process of claim 1 wherein said unsaturated acid is acrylic acid.

7. The process of claim 1 wherein the polymerizable monomers are dissolved in the solvent in an amount up to 60 weight percent.

8. The process of claim 1 wherein said crosslinking agent is an alkylated amino crosslinking agent.

* * * * *

UNITED STATES PATENT AND TRADEMARK OFFICE
CERTIFICATE OF CORRECTION

PATENT NO. : 4,215,029

DATED : July 29, 1980

INVENTOR(S) : Frank L. Saunders; Victor E. Meyer

It is certified that error appears in the above-identified patent and that said Letters Patent are hereby corrected as shown below:

Col. 1, line 41, after "2" delete "1".

Col. 1, line 62, delete "butylstryrenes," and insert --butylstyrenes,--.

Signed and Sealed this

Thirtieth Day of December 1980

[SEAL]

Attest:

SIDNEY A. DIAMOND

Attesting Officer

Commissioner of Patents and Trademarks